June 20, 1961 E. C. PARK, JR., ET AL 2,989,714

ELECTRICAL CIRCUIT ELEMENT

Filed June 25, 1958

Inventors
Edward C. Park, Jr.
Carl Russell Smallman
by Roberts, Cushman & Grover
Att'ys United States Patent Office 2,989,714

Patented June 20, 1961

2,989,714

ELECTRICAL CIRCUIT ELEMENT

Edward C. Park, Jr., Salem, and Carl Russell Smallman, Lexington, Mass., assignors to Arthur D. Little, Inc., Cambridge, Mass., a corporation of Massachusetts Filed June 25, 1958, Ser. No. 744,442

13 Claims. (Cl. 338—32)

This invention relates to electrical circuit elements, particularly superconductors, and has for its object to provide a superconductive circuit element with increased current carrying capacity.

As described in The Cryotron, by D. A. Buck, Proc. I.R.E., vol. No. 44, April 1956, pages 483 to 493, various materials, such as tantalum, niobium and lead, when reduced below a critical temperature, are placed in a superconducting state in which they will carry electrical current without resistance. A superconductor formed of such materials may, while held below its critical temperature, be changed from its superconducting state, through a transition state, to a normal or finite resistance state by the application of a magnetic field which is above a threshold or critical value. The magnetic field may be applied by passing current through the superconductor itself or by inducing a field in an adjacent control conductor or coil, or by a combination of the two. With a control superconductor may be used as a switching device.

Whether or not a control is used as described by Buck, the current carrying capacity of a superconductor has hitherto been limited by its self-induced field. If the current through the superconductor exceeds a predeterminable value, the self-induced field will quench the superconductor, that is, cause it to change from superconducting to finite resistance state. In the case of the Buck controlled cryotron, excessive self-induced field removes the superconductor from the control of an external field. In other instances the self-induced field severely limits the current carrying capacity and usefulness of the superconductor.

According to the present invention an electrical circuit element of increased current carrying capacity comprises a first superconductive body of predetermined length and width which is adapted to be connected in an electrical circuit, and a second superconductive body of at least the same length and width disposed closely adjacent the first body. By width it is meant to include the diameter of a round wire, or a like transverse dimension.

The close proximity of the second body, in a manner not fully understood, either actively or passively influences or controls the self-induced field of the superconductor in such a way as to affect the self-quenching effect of the field, thereby permitting the superconductor to carry greater current than previously possible. The present circuit element is particularly useful in combination with inductive means for applying a magnetic control field to the first-mentioned body.

For the purpose of illustration typical embodiments of the invention are shown in the accompanying drawing in which.

Figure 1:
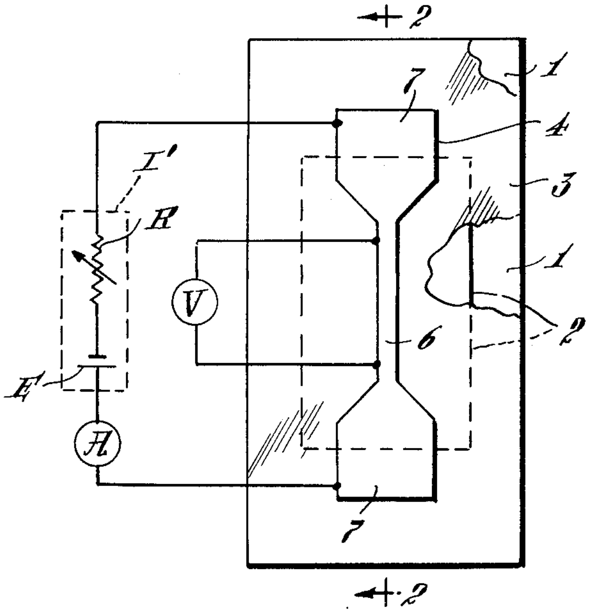
FIG. 1 is a plan view of a superconductive circuit element connected in a circuit.
Figure 2:
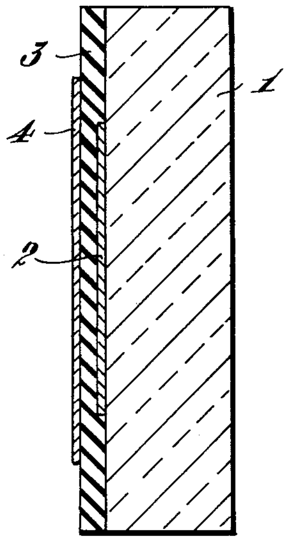
FIG. 2 is a section on line 2—2 of FIG. 1.

As shown in FIGS. 1 and 2 a novel circuit element is constructed on a support or substrate 1 of glass or other insulating material. A thin layer of lead 2 is attached to the support 1 as a deposit or a foil. The thickness of the lead layer is not critical, but may be in the order of $\frac{1}{10,000}$ cm. Over the lead layer is laid a film 3 of insulating material such as Mylar (one thousandth of a centimeter thick) or silicon monoxide (10 to 100 microns thick). On the insulating film is laid or deposited another layer of superconductive material 4, for example, an 0.005 inch thick layer of tantalum having a rectangular cross section. The superconductive layer 2 is preferably spaced from the other layer 4 not more than approximately twice the thickness of the other layer, the spacing being determined by the thickness of the insulating film 3.

The superconductive layer 4 is adapted to be connected in an electrical circuit, and as shown has a middle portion 6 and terminal portions 7. By way of example the terminal portions 7 are shown connected in series with a primary current source I′ comprising a voltage supply E and a variable resistor R which is so high compared to the normal resistance of the middle portion 6 that transition of the portion 6 between zero and finite resistance state does not materially alter the primary current. An ammeter A connected in series with the current source measures primary current, and a voltmeter V in parallel with the middle portion 6 indicates the state of the middle portion by measuring the IR drop, if any, across this portion.

According to the invention the underlying superconductive layer 2 is at least as great in width and length as the middle portion 6, which portion comprises the effective circuit element since here the effect of self-inductance is greatest. As shown in FIGS. 1 to 4 the surface of the layer 2 facing the middle-current-carrying portion 6 is wider and longer than that portion 6, and is isolated by the substrate 1 and insulating layer 3 from any electrical current source. By varying the resistance R, and hence the primary current, the current capacity of the element 6 may be tested. When current through the element becomes too great the self-induced field changes the element to a state of finite resistance indicated by the voltmeter. It has been shown that the element 6 will carry greater current without self-quenching when the closely adjacent superconductive layer 2 is provided than when it is not, so long as the adjacent superconductive layer remains in superconducting state. Thus preferably the adjacent superconductor 2 has a higher threshold or critical field value than the circuit element 6 at some point below the critical temperature of the circuit element.

The adjacent superconductor not only increases the current carrying capacity of the circuit element but also reduces its inductance. Hence the adjacent superconductor may be advantageously used in any circuit wherein it is desired to increase the current carrying capacity of the element, to vary or control its inductance and hence the time to pass through transition, or to provide an impedance matching transmission line comprising the two superconductors.

It will be understood that the effective circuit element 6 may be a short length as shown, or a long line with branches and several controlled portions such as will be described with reference to FIGS. 3 to 5. Preferably the terminal ends of the line, such as portions 7, are widened to increase their current carrying capacity to the capacity of the line adjacent which the superconductor 2 disposed.

Figure 3:
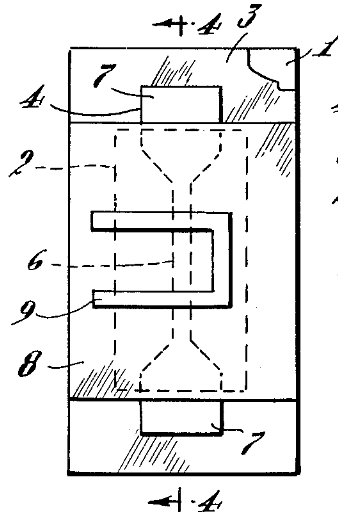
FIG. 3 is a plan view of the element of FIG. 1 in combination with a control means.
Figure 4:
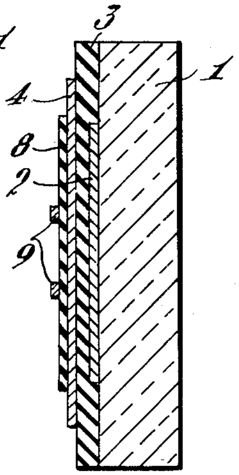
FIG. 4 is a section on line 4—4 of FIG. 3.

In FIGS. 3 and 4 is shown a circuit element comprising the lead sheet 2, insulation 3 and tantalum superconductor 4 mounted on a glass plate 1 as in FIGS. 1 and 2. Over the middle portion 6 of the superconductor 4 is coated a further insulating layer 8, the terminals 7 remaining exposed. A control conductor 9, preferably of a superconductive material such as lead, is applied on the insulating layer 8 crossing the element 6 so that when current is passed through the control conductor 9 the induced magnetic field of the control 9 destroys the superconductivity of the element 6 rendering it resistive. The control 9 and element 6 thus act as a switch or valve offering either zero or a finite resistance to current flowing through the element 6. As in the embodiment of FIGS. 1 and 2 the layer 2 permits the element 6 to carry increased current without self-quenching itself and thereby removing itself from control of the conductor 9.

Figure 5:
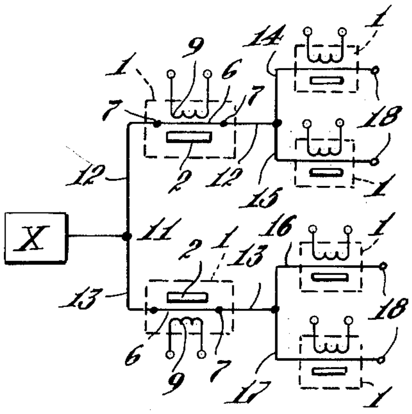
FIG. 5 is a schematic drawing of a circuit employing the element of FIGS. 3 and 4.

The switching element of FIGS. 3 and 4 may be used in cryotron circuits such as are shown in the Buck article, which circuits require that the cryotron have gain, or they may be used in the tree circuit illustrated in FIG. 5 wherein gain is not required.

The tree circuit of FIG. 5 comprises an A.C. or D.C. signal source X connected to two branch paths 12 and 13 which in turn connect to further branch paths 14 to 17 inclusive leading to terminals 18. In each of the paths 12 to 17 is one of the valve elements of FIGS. 3 and 4. The paths 12 to 17 are wholly superconducting from the junction 11 to the terminals 18. The superconductive valve elements may be inserted in the paths as shown in paths 12 and 13, or may be continuous with the paths as with paths 14 to 17. By control of the valves the signal or current at the junction 11 may be routed to a selected terminal 18. For example, if current is supplied to the controls 9 of paths 12 and 16, these paths will become resistive while paths 13 and 17 will remain in zero resistance state. All current from the source X will then take the zero resistance path to the terminal of path 17.

Figure 6:
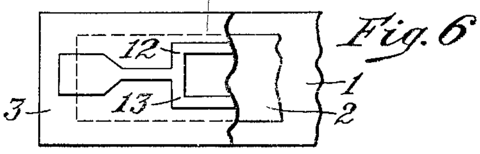
FIG. 6 is a plan view, partly broken away, of the circuit of FIG. 5.

While FIG. 5 illustrates the use of the adjacent superconductor 2 in combination with a valve element 6 and control 9, the superconductor 2 may be advantageously used adjacent the conducting paths 12 to 17 to increase their current carrying capacity and reduce their self-inductance as shown in FIG. 6. The superconductor 2 may be flat or curved, depending in part on whether the circuit element is rectangular or rounded in cross section.

Thus, it should be understood that the present disclosure is for the purpose of illustration only, and that the invention includes all modifications and equivalents within the scope of the present invention.

We claim:

1. An electric circuit element comprising a support, a sheet of superconductive material carried thereon, a body of superconductive material on the support and insulated from said sheet, said body being of predetermined length and width and said sheet being of at least substantially the same length and width, and said sheet having a surface closely spaced adjacent and substantially parallel to said body, said surface having an area substantially greater than said body facing said body thereby to control a magnetic field induced about said body by current through the body.

2. An electrical current element comprising a support, a layer of superconductive material thereon, an insulative coating over said layer and a film of superconductive material on said coating, said layer having substantial surface area facing and being at least coextensive with a portion of said film to control a magnetic field induced between said layer and film portion by current through said film.

3. An electrical circuit element comprising a first superconductive body of predetermined width and length and adapted to be connected in an electrical circuit, a second superconductive body of at least substantially the same length and width and having a substantial surface area facing and disposed closely adjacent the first said body to control a magnetic field about the first body induced by current through the first body and current carrying inductive means for applying a magnetic field to the first body.

4. An electrical circuit element comprising a first superconductive body of predetermined width and length and adapted to be connected in an electrical circuit, and a second superconductive body of at least substantially the same length and width and having a substantial surface area facing and disposed closely adjacent the first said body to control a magnetic field about the first body induced by current through the first body, said second body having a higher critical field value than said first body below the critical temperature of the first body.

5. An electrical circuit element comprising a first superconductive body of predetermined width and length, said body being adapted to conduct current through a portion thereof and thereby induce a magnetic field around the body, and a second superconductive body having a surface at least substantially as long as and wider than said first body portion, said surface being disposed closely adjacent and facing said first body, and being adapted to substantially modify the field around said first body.

6. An electrical transmission device comprising an elongate superconductive element of predetermined width and length adapted to carry electrical current and induce a magnetic field about itself, said element having at a given temperature a super current capacity limited by its self field, and a superconductive body having a surface at least substantially as long as and wider than said element, said surface being disposed closely adjacent and facing said element, and said body being composed of a superconductive material which is normally superconductive at said given temperature, thereby to modify the field around said element substantially.

7. An electrical circuit device comprising a first superconductive body of predetermined width and length, said body being adapted to conduct current through a portion thereof and thereby induce a magnetic field around the body, and a second superconductive body having a surface at least substantially as long as and wider than said first body portion, said surface being disposed closely adjacent and facing said first body, said second body having a threshold field value at least as high as said first body below the critical temperature of the first body.

8. An electrical circuit device comprising a first superconductive body of predetermined width and length, said body being adapted to conduct current through a portion thereof and thereby induce a magnetic field around the body, and a second superconductive body having a surface at least substantially as long as and wider than said first body portion, said surface being disposed closely adjacent and facing said first body, and being adapted to substantially modify the field around said first body, the second body being isolated from any electrical current source.

9. An electrical circuit device comprising a insulating support having a planer surface, a layer of superconductive material on said support, at least one superconductive path of generally rectangular cross section disposed close to and insulated from said layer, said path being adapted to conduct a current and induce a self field around the path, and said layer modifying the field around said path, thereby to increase its current carrying capacity.

10. An electrical circuit device comprising a insulating support having a planar surface, a layer of superconductive material on said support, at least one superconductive gate of generally rectangular cross section disposed close to and insulated from said layer, and a control conductor disposed on the same side of said layer as said gate, and adapted to apply a controlling magnetic field to said gate to cause transition of said gate between superconducting and finite resistance state, said gate being adapted to conduct a current and induce a self field around the gate, and said layer modifying the field around said gate, thereby to increase its current carrying capacity.

11. An electrical circuit comprising means forming a plurality of parallel, superconductive paths, each of said paths being adapted to carry current and induce a self field around each path and selectively to change from a superconductive to a resistive state in which current is diverted to another path, and superconductive means including surface forming means of superconductive material having at least as high a threshold field value as the paths below the critical temperature of said paths, said surface forming means being disposed closely adjacent said paths to modify the field around said paths thereby to increase the current carrying capacity of each path and to increase the speed with which current is diverted from one path to another.

12. An electrical circuit comprising means forming a plurality of parallel, superconductive paths, each of said paths being adapted to carry current and induce a self field around each path and to change from a superconducting to a resistive state in which current is diverted to another path, surface forming means of superconductive material having at least as high a threshold field value as the paths below the critical temperature of said paths, said surface forming means being disposed closely adjacent said paths to modify the field around said paths thereby to increase the current carrying capacity of each path and the speed with which current is diverted from one path to another, and for each path control means on the same side of said surface forming means as said paths, each said control means being capable of influencing change of its path from superconducting to resistive state.

13. An electrical transmission device comprising an elongate superconductive conductor element having current terminals at each end thereof, said element being of predetermined width and length adapted to carry electrical current and induce a magnetic field about itself, and said element having at a given temperature a super current capacity limited by its self field, and a superconductive body having a surface at least substantially as long as and wider than said element, said surface being disposed closely adjacent and facing said element throughout said predetermined length between said terminals, and said body being composed of a superconductive material which is normally superconductive at said given temperature, thereby substantially to modify the field around said element and increase its current carrying capacity throughout said predetermined length between said terminals.

References Cited in the file of this patent

UNITED STATES PATENTS

| | | |
|---|---|---|
| 2,189,122 | Andrews | Feb. 6, 1940 |
| 2,599,550 | Fraser | June 10, 1952 |

Notice of Adverse Decision in Interference

In Interference No. 93,290 involving Patent No. 2,989,714, E. C. Park, Jr., and C. R. Smallman, ELECTRICAL CIRCUIT ELEMENT, final judgment adverse to the patentees was rendered July 26, 1965, as to claims 1, 2, 3, 4, 5, 6, 7, 8, 9, 10 and 13.

[*Official Gazette September 28, 1965.*]